US012809916B2

(12) United States Patent
Ellenki et al.

(10) Patent No.: US 12,809,916 B2
(45) Date of Patent: Nov. 24, 2026

(54) QUANTUM DRIVEN USER SPECIFIC REAL TIME DYNAMIC VIDEO RENDERING SYSTEM

(71) Applicant: Bank of America Corporation, Charlotte, NC (US)

(72) Inventors: Architha Ellenki, Plano, TX (US); Madhumitha Swaminathan Rangarajan, Chennai (IN); Dhuvaraga Prasath B, Tiruppur (IN); Puneet Kalra, Faridabad (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/790,351

(22) Filed: Jul. 31, 2024

(65) Prior Publication Data

US 2026/0037575 A1 Feb. 5, 2026

(51) Int. Cl.
*G06F 16/738* (2019.01)
*G06F 16/735* (2019.01)

(52) U.S. Cl.
CPC .......... *G06F 16/738* (2019.01); *G06F 16/735* (2019.01)

(58) Field of Classification Search
CPC ............................. G06F 16/738; G06F 16/735
See application file for complete search history.

(56) References Cited

U.S. PATENT DOCUMENTS 9,882,918 B1 * 1/2018 Ford ....................... H04L 63/14
10,803,395 B2 10/2020 Pistoia et al.
11,295,583 B1 * 4/2022 Bansal .................. H04N 7/188
11,736,122 B1 8/2023 Yoder
11,750,741 B2 9/2023 Karp et al.
11,784,796 B2 10/2023 Ragan et al.
12,235,897 B1 * 2/2025 Hao .................... G06F 16/7844
2012/0323828 A1 * 12/2012 Sontag .................... G06F 16/93 707/E17.014
2013/0141529 A1 * 6/2013 Sathish ........... H04N 21/41407 348/43
2018/0131645 A1 * 5/2018 Magliozzi ............... G06F 40/30
2019/0005021 A1 * 1/2019 Miller ..................... G10L 15/22
(Continued)

FOREIGN PATENT DOCUMENTS

CN 108989885 B 8/2020

*Primary Examiner* — Marc S Somers
(74) *Attorney, Agent, or Firm* — Banner & Witcoff, Ltd.

(57) ABSTRACT

A computing platform may receive chatbot interaction information indicating interactions of a user with a chatbot. The computing platform may identify context information associated with the user. The computing platform may generate, based on the chatbot interaction information and the context information, responses to the user interactions, and may select a response. The computing platform may generate a plurality of image frames corresponding to the response. The computing platform may arrange, based on the context information and using an intelligent frame estimation engine, the plurality of image frames in a sequence. The computing platform may render a video output, comprising a response to the chatbot interaction information, using the plurality of image frames and based on the sequence. The computing platform may generate? commands directing the user device to display the video output, which may cause the user device to display the video output.

20 Claims, 8 Drawing Sheets

(56) References Cited

U.S. PATENT DOCUMENTS

| | | | | |
|---|---|---|---|---|
| 2020/0218940 | A1* | 7/2020 | Anglin | H04L 9/0637 |
| 2022/0147358 | A1* | 5/2022 | Perdomo Ortiz | G06N 3/045 |
| 2023/0112525 | A1 | 4/2023 | Naveh et al. | |
| 2023/0244663 | A1 | 8/2023 | Chandroliya et al. | |
| 2023/0274178 | A1 | 8/2023 | Griffin et al. | |
| 2023/0275755 | A1 | 8/2023 | Woodward et al. | |
| 2023/0281500 | A1 | 9/2023 | Griffin et al. | |
| 2023/0376277 | A1 | 11/2023 | Venkatachalam et al. | |
| 2023/0376820 | A1 | 11/2023 | Mukherjee | |
| 2023/0410545 | A1* | 12/2023 | Slensker | G01S 17/89 |
| 2024/0054110 | A1 | 2/2024 | Zhou et al. | |
| 2024/0061724 | A1 | 2/2024 | Zhao et al. | |
| 2024/0073010 | A1 | 2/2024 | Ganguly et al. | |
| 2024/0119338 | A1 | 4/2024 | Chandroliya et al. | |
| 2024/0143894 | A1 | 5/2024 | Widdows et al. | |
| 2024/0160979 | A1 | 5/2024 | Pinho et al. | |
| 2024/0184859 | A1* | 6/2024 | Akkapeddi | G06F 3/06 |
| 2024/0232146 | A1 | 7/2024 | Hukmani et al. | |
| 2024/0242101 | A1 | 7/2024 | Griffin et al. | |
| 2024/0292073 | A1* | 8/2024 | Khalil | G06V 20/46 |
| 2024/0355119 | A1* | 10/2024 | Croitoru | G10L 15/04 |

* cited by examiner

QUANTUM DRIVEN USER SPECIFIC REAL TIME DYNAMIC VIDEO RENDERING SYSTEM

BACKGROUND

Despite several technological advancements in various industries, customer experiences might still not be query driven in their entirety. As continuous growth occurs with regard to customer services/products, it may be highly important to similarly improve the customer experience and level of satisfaction with these services/products. Currently, solutions may use manual intervention to provide responses to complex queries to be able to serve the customer, which may lead to a significant expenditure of manpower and time, and which also may be error prone due to human error. Accordingly, it may be important to provide an improved solution for query response that maximizes computing efficiency and minimizes likelihood of error.

SUMMARY

Aspects of the disclosure provide effective, efficient, scalable, and convenient technical solutions that address and overcome the technical problems associated with providing customized responses using chatbot interfaces. In accordance with one or more embodiments of the disclosure, a computing platform comprising at least one processor, a communication interface, and memory storing computer-readable instructions may receive chatbot interaction information indicating interactions of a user with a chatbot. The computing platform may identify context information associated with the user. The computing platform may generate, by inputting the chatbot interaction information and the context information into a semantic understanding and content summarization engine, a plurality of responses to the user interactions. The computing platform may select a first response of the plurality of responses to the user interactions. The computing platform may generate a plurality of image frames corresponding to the first response. The computing platform may arrange, based on the context information and using an intelligent frame estimation engine, the plurality of image frames in a first sequence. The computing platform may render a video output using the plurality of image frames and based on the first sequence, where the video output may include a response to the chatbot interaction information. The computing platform may send, to a user device of the user, the video output and one or more commands directing the user device to display the video output, which may cause the user device to display the video output.

In one or more instances, the chatbot interaction information may include a request from the user, and the video output may include a tutorial providing a response to the request. In one or more instances, the context information may include historical chatbot interactions for the user.

In one or more examples, the computing platform may store, using a distributed ledger, the context information. In one or more examples, the computing platform may train, using historical chatbot interaction information and historical context information, the semantic understanding and content summarization engine, which may configure the semantic understanding and content summarization engine to output a plurality of responses to chatbot requests.

In one or more instances, the computing platform may extract, from the chatbot interaction information, one or more keywords, where generating the plurality of responses may be based on the one or more keywords. In one or more instances, selecting the first response may include: 1) ranking, based on the context information, the plurality of responses, and 2) selecting a highest ranked response of the plurality of responses.

In one or more examples, a ranking of the plurality of responses for a first user may be different than a ranking of the plurality of responses for a second user. In one or more examples, generating the plurality of image frames corresponding to the first response may include: generating, based on the first response, input information for a quantum image generator, formatting the input information using quantum error correction, and inputting the input information into the quantum image generator.

In one or more instances, the computing platform may train, using historical chatbot interaction information and historical context information, the intelligent frame estimation engine, which may configure the intelligent frame estimation engine to output frame sequences. In one or more instances, the computing platform may receive feedback information on the video output, and update, based on the feedback information, the semantic understanding and content summarization engine and the intelligent frame estimation engine.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure relate to performing quantum driven user specific real time dynamic video. The proposed quantum driven user specific real time dynamic video file rendering involves quantum infused hyperledger fabric (QIHLF), which may be a distributed network storing support articles and capturing user activity in an edge node. A quantum enabled search engine may assist with faster retrieval of results by using the principles of superposition. A semantic understanding and content summarization engine may extract keywords from the chatbot and may assign relevance rankings based on matches and prioritize results. The output may be stored in a quantum bit ("qubit") lattice. A quantum encryption ("quancryption") module may perform quantum error correction and keyword retrieval, and may store this information in the qubit storage medium. The quantum image generator may have an encoder-decoder pair for generating the image from the keyword and storing it in a superimposed state. The deep reinforcement learning processor may be coupled with an image frame estimator engine, which may study the image for related issues over a period of time, and retrieved images may be sent to a video rendering module and the final dynamic video may be sent to the user's chatbot.

In doing so, the case of submitting questions and receiving a query driven demonstration video may contribute to a positive user experience. The QIHLF may evaluate the need of the user based on the edge node by incorporating quantum principles to optimize consensus such as fault tolerance for improved scalability and efficiency. Semantic understanding and content summarization may enable better and proactive search based on keywords extracted from the chatbot. The probabilistic cognitive error cancellation module may be coupled with an intelligent image frame estimator to run multiple trials to arrive at a best probable match with ledger data, and to store the image frame after studying historical activities of the user.

These and other features are described in further detail below.

Figure 1A:
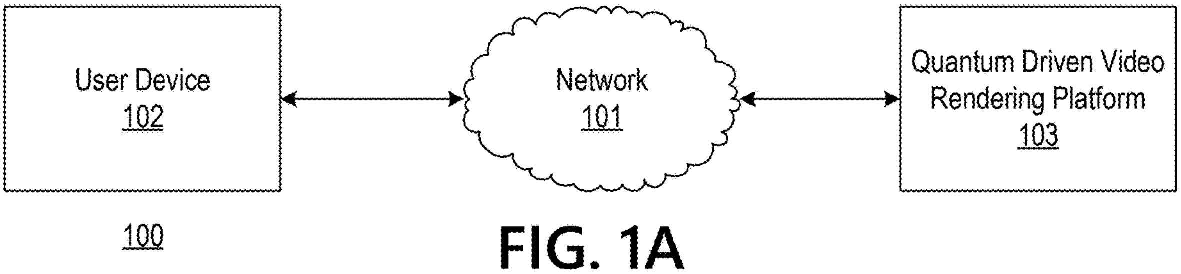
FIGS. 1A-1B depict an illustrative computing environment to support a quantum driven user specific real time dynamic video rendering system in accordance with one or more example embodiments.
Figure 1B:
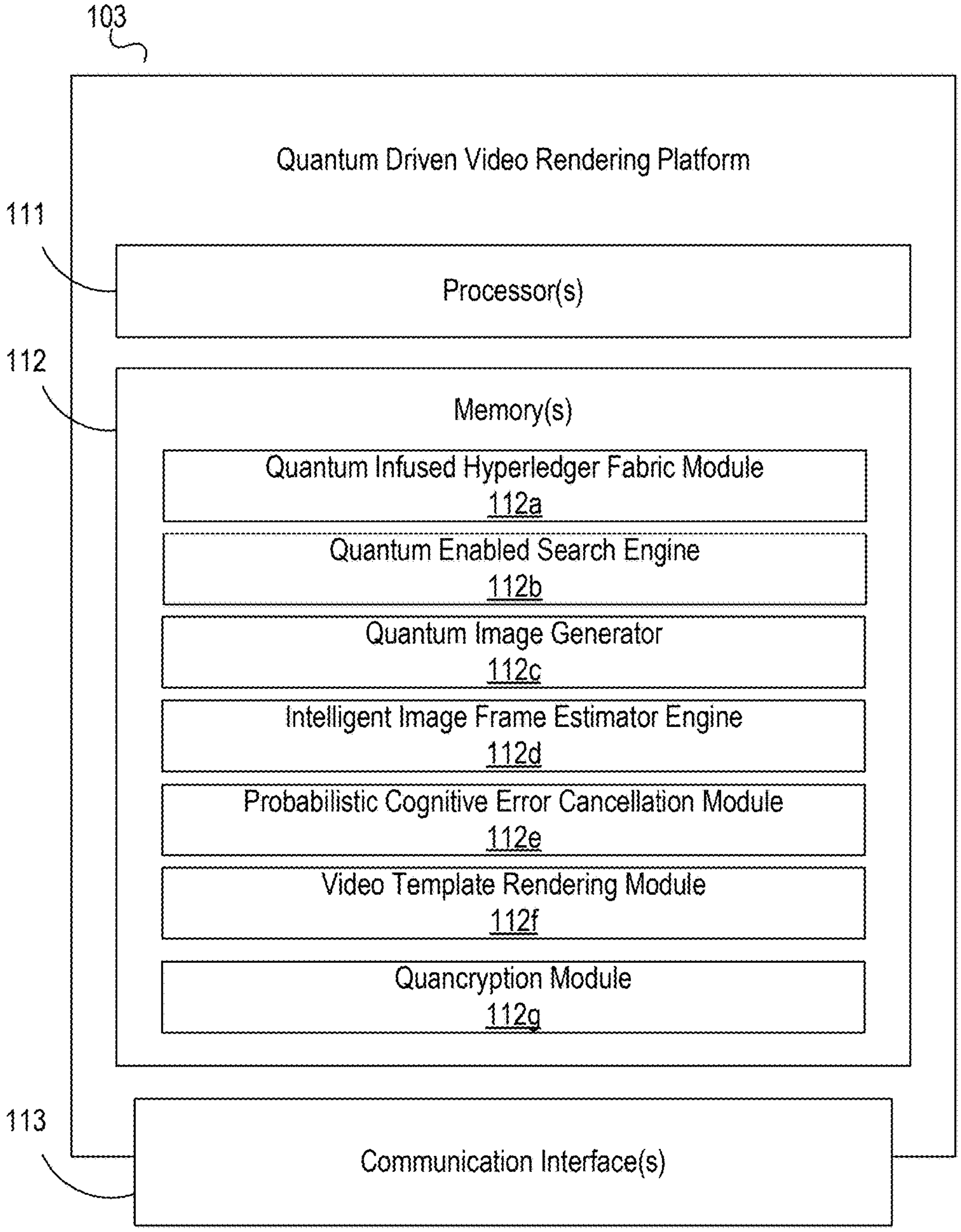

FIGS. 1A-1B depict an illustrative computing environment for performing quantum driven user specific real time dynamic video rendering in accordance with one or more example embodiments. Referring to FIG. 1A, computing environment 100 may include one or more computer systems. For example, computing environment 100 may include user device 102 and quantum driven video rendering platform 103.

User device 102 may be and/or otherwise include one or more devices such as a laptop computer, desktop computer, mobile device, tablet, smartphone, and/or other device that may be used by an individual to submit queries and/or other natural language based requests via a chatbot application. In some instances, the user device 102 may be configured to display one or more graphical user interfaces (e.g., chatbot interfaces, or the like).

Quantum driven video rendering platform 103 may be a computer system that includes one or more computing devices (e.g., servers, server blades, or the like) and/or other computer components (e.g., processors, memories, communication interfaces) that may be used to support chatbot request processing, host and/or otherwise access a distributed ledger, support chatbot response generation, provide frame generation and/or video rendering, and/or to perform other functions. In some instances, the quantum driven video rendering platform 103 may train, host, and/or otherwise refine one or more machine learning models, large language models, and/or other models that may be used to support quantum driven video rendering for chatbot applications. In some instances, the quantum driven video rendering platform 103 may be a quantum computing platform.

Although a single user device 102 is shown, any number of such devices may be used to implement the methods described herein without departing from the scope of the disclosure.

Computing environment 100 also may include one or more networks, which may interconnect user device 102 and quantum driven video rendering platform 103. For example, computing environment 100 may include a network 101 (which may interconnect, e.g., user device 102 and quantum driven video rendering platform 103).

In one or more arrangements, user device 102 and quantum driven video rendering platform 103 may be any type of computing device capable of sending and/or receiving requests and processing the requests accordingly. For example, user device 102, quantum driven video rendering platform 103, and/or the other systems included in computing environment 100 may, in some instances, be and/or include server computers, desktop computers, laptop computers, tablet computers, smart phones, and/or other devices that may include one or more processors, memories, communication interfaces, storage devices, and/or other components. As noted above, and as illustrated in greater detail below, any and/or all of user device 102 and/or quantum driven video rendering platform 103 may, in some instances, be special-purpose computing devices configured to perform specific functions.

Referring to FIG. 1B, quantum driven video rendering platform 103 may include one or more processors 111, memory 112, and communication interface 113. A data bus may interconnect processor 111, memory 112, and communication interface 113. Communication interface 113 may be a network interface configured to support communication between quantum driven video rendering platform 103 and one or more networks (e.g., network 101, or the like). Memory 112 may include one or more program modules having instructions that when executed by processor 111 cause quantum driven video rendering platform 103 to perform one or more functions described herein and/or one or more databases that may store and/or otherwise maintain information which may be used by such program modules and/or processor 111. In some instances, the one or more program modules and/or databases may be stored by and/or maintained in different memory units of quantum driven video rendering platform 103 and/or by different computing devices that may form and/or otherwise make up quantum driven video rendering platform 103. For example, memory 112 may have, host, store, and/or include quantum infused hyperledger fabric module 112*a*, quantum enabled search engine 112*b*, quantum image generator 112*c*, intelligent image frame estimator engine 112*d*, probabilistic cognitive error cancellation module 112*e*, video template rendering module 112*f*, and quancryption module 112*g*.

Quantum infused hyperledger fabric module 112*a* may enhance security, scalability, and/or efficiency in an enterprise blockchain, enrich data analytics and insight generation using a vast amount of data in the enterprise blockchain, and gather relevant articles of enterprise options and capture user activity at edge nodes. Quantum enabled search engine 112*b* may be equipped with a controller unit that may gather relevant keywords from a customer chatbot and check the quantum infused hyperledger fabric module 112*a* for relevant articles from edge nodes. This quantum enabled search engine 112*b* may retrieve results faster using the principle of superposition and by referring to the articles from the quantum infused hyperledger fabric module 112*a*. Additionally, the quantum enabled search engine 112*b* may extract keywords from a chatbot and semantic understanding and content summarization engine (which may, e.g., be included in the quantum enabled search engine 112*b*), which may help assign a relevance ranking to prioritize results (the output of which may be stored in a qubit lattice). The quantum image generator 112*c* may generate frame images corresponding to the prioritized results, which may e.g., be used to assemble video content. The quantum image generator 112*c* may process information using novel adaptive quantum representation techniques to produce the images. These quantum image representations may encode color pixels as well as positions in different ways, and thus the different representations may be different in terms of image processing applications and algorithmic complexity. Intelligent image frame estimator engine 112*d* may be equipped with the continuous learner module, which may provide estimates and assign coordinate values for each image to be checked further with data from the chatbot. Probabilistic cognitive error cancellation module 112*e* may receive data from the image frame estimator engine and run trials to arrive at a best probable match with an edge node. An entanglement quotient may be used to generate the entangled score from the output of the qubit lattice storage from a chatbot end processed image. The output from the image frame processed post error cancellation may be embedded with a template from the video rendering template and synthesized dynamic video in real time and may be sent to a customer chatbot. The video template rendering module 112*f* may render a video based on the frames generated by the quantum image generator 112*c*. Quancryption module 112*g* may perform error correction, and store the results in a qubit storage medium. The data may be sent from the quancryption module 112*g* to the quantum image generator 112*c*.

Figure 2A:
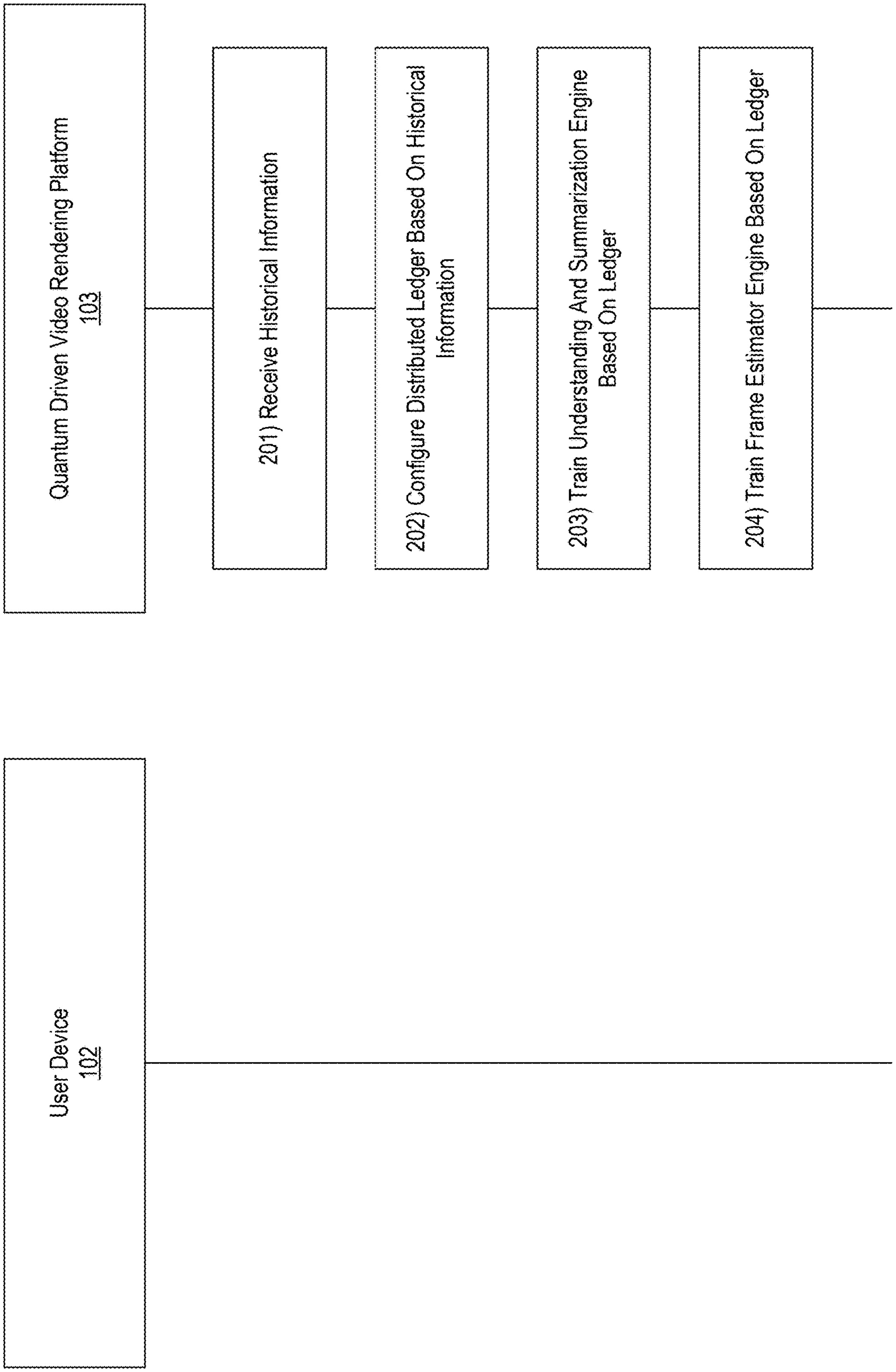
FIGS. 2A-2E depict an illustrative event sequence for performing quantum driven user specific real time dynamic video rendering in accordance with one or more example embodiments.

FIGS. 2A-2E depict an illustrative event sequence for performing quantum driven video rendering in accordance with one or more example embodiments. Referring to FIG. 2A, at step 201, quantum driven video rendering platform 103 may receive historical information. For example, the quantum driven video rendering platform 103 may receive historical information associated with user context (e.g., account information, demographic information, chatbot interactions, and/or other information), enterprise information (historical transaction records, and/or other information), enterprise support documentation, and/or other information that may be used to provide context associated with user queries. In some instances, the quantum driven video rendering platform 103 may receive the historical information from one or more edge nodes, which may e.g., be or include user devices such as the user device 102. In instances where enterprise support documentation is received as part of the historical information, this enterprise support documentation may be received from a quantum infused hyperledger fabric (QIHLF), which may be or include a distributed network storing enterprise support help articles. In some instances, the QIHLF may be used to capture the historical information from the one or more edge nodes. In some instances, a quantum enabled search engine may be used by the quantum driven video rendering platform 103 to increase speed of retrieval of the support articles and/or other historical information from the QIHLF using superposition.

At step 202, the quantum driven video rendering platform 103 may establish a distributed ledger based on the historical information. For example, the quantum driven video rendering platform 103 may configure a plurality of ledger entries corresponding to each of a plurality of users and corresponding events associated with these users. For example, each entry of the ledger may reflect an interaction between a given user and an enterprise (e.g., a request from the enterprise, such as to modify account information, execute a transaction, and/or other requests).

At step 203, the quantum driven video rendering platform 103 may train an semantic understanding and content summarization engine to output keywords, query responses, or the like, specific to a user context, based on queries received via a chatbot interface. For example, the quantum driven video rendering platform 103 may access the distributed ledger to obtain and input historical queries, keywords, responses, context information, technical support guidelines/articles, and/or other information into the semantic understanding and content summarization engine, which may, e.g., configure the quantum driven video rendering platform 103 to establish stored correlations between the queries and the corresponding keywords, responses, or the like, given different context information. In some instances, in training the semantic understanding and content summarization engine, the quantum driven video rendering platform 103 may apply natural language processing, natural language understanding, supervised machine learning techniques (e.g., regression, classification, neural networks, support vector machines, random forest models, naïve Bayesian models, and/or other supervised techniques), unsupervised machine learning techniques (e.g., principal component analysis, hierarchical clustering, K-means clustering, and/or other unsupervised techniques), and/or other techniques.

In some instances, the semantic understanding and content summarization engine may be trained on a user by user basis, so as to provide different responses for different users depending on their corresponding context information. For example, the training process may involve training the semantic understanding and content summarization engine to score keywords, responses, or the like output for a given query based on the corresponding context information, which may, e.g., enable the semantic understanding and content summarization engine to provide a ranked set of results for responding to a query. In some instances, due to the user context information, different responses may receive a highest ranking for different users. To train the semantic understanding and content summarization engine in this way, the quantum driven video rendering platform 103 may also input historical relevance scores correlated with responses given a particular user context, which may, e.g., allow the semantic understanding and content summarization engine to established stored correlations between such relevance scores and responses for a given user query, in view of the corresponding user context.

At step 204, the quantum driven video rendering platform 103 may train an intelligent frame estimator engine to output a frame sequence, specific to a user context, that may be used to render a video output for responding to queries received via a chatbot interface. For example, the quantum driven video rendering platform 103 may input historical queries, context information, sequence information, and/or other information into the intelligent frame estimator engine, which may, e.g., configure the quantum driven video rendering platform 103 to establish stored correlations between the queries and the frame sequences, given different context information. In some instances, in training the intelligent frame estimator engine, the quantum driven video rendering platform 103 may apply natural language processing, natural language understanding, supervised machine learning techniques (e.g., regression, classification, neural networks, support vector machines, random forest models, naïve Bayesian models, and/or other supervised techniques), unsupervised machine learning techniques (e.g., principal component analysis, hierarchical clustering, K-means clustering, and/or other unsupervised techniques), and/or other techniques.

In some instances, the intelligent frame estimator engine may be trained on a user by user basis, so as to provide different frame sequences (and thus different video responses) for different users depending on their corresponding context information. For example, given the same input query, the intelligent frame estimator engine may be trained to output a first frame sequence for a first user and a second frame sequence for a second user.

Figure 2B:
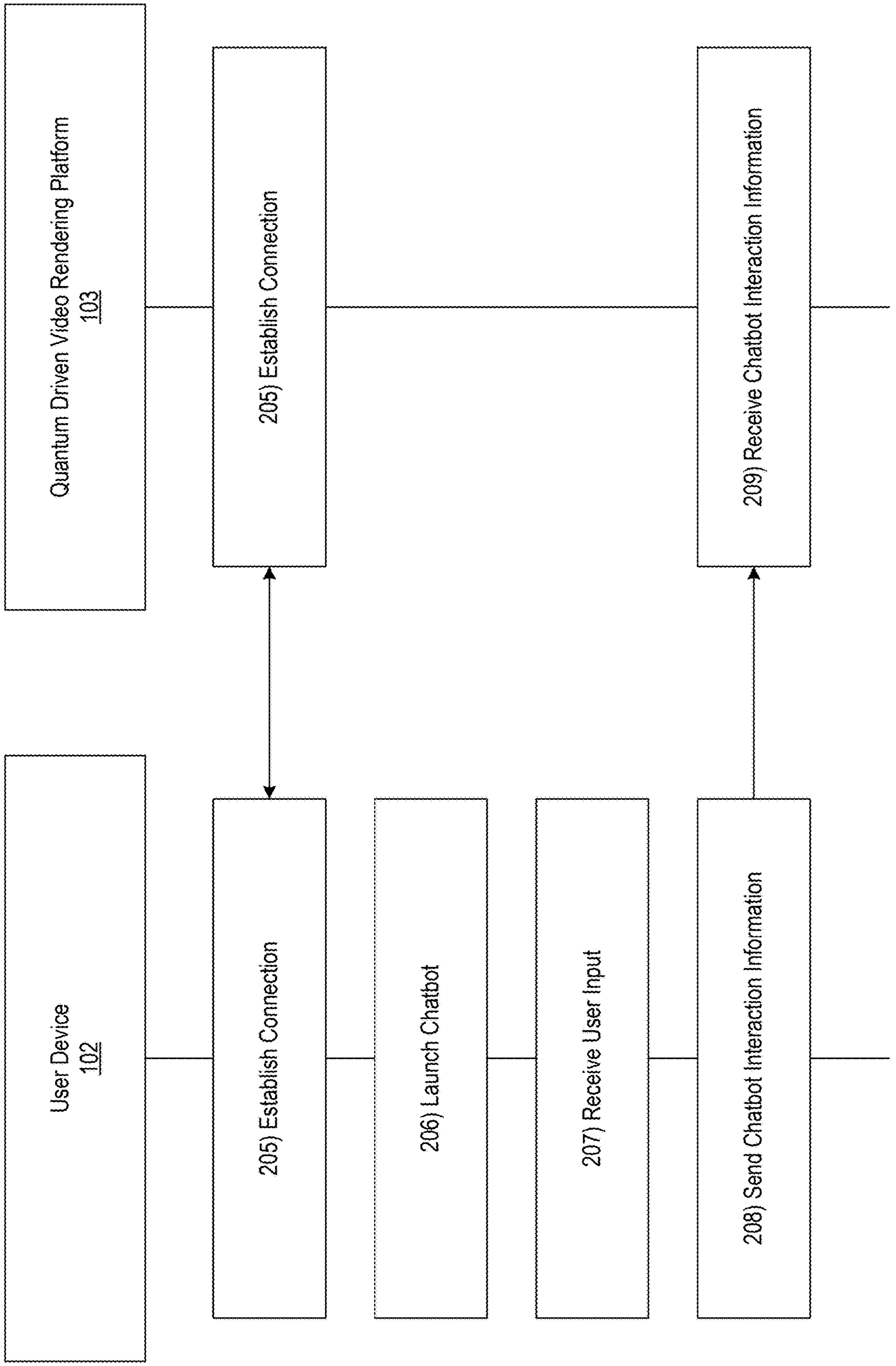

Referring to FIG. 2B, at step 205, the user device 102 may establish a connection with the quantum driven video rendering platform 103. For example, the user device 102 may establish a first wireless data connection with the quantum driven video rendering platform 103 to link the user device 102 to the quantum driven video rendering platform 103 (e.g., in preparation for facilitating video responses to user queries via a chatbot). In some instances, the user device 102 may identify whether or not a connection is already established with the quantum driven video rendering platform 103. If a connection is already established with the quantum driven video rendering platform 103, the user device 102 might not re-establish the connection. Otherwise, if a connection is not yet established with the quantum driven video rendering platform 103, the user device 102 may establish the first wireless data connection as described herein.

At step 206, the user device 102 may launch a chatbot application. In some instances, this may involve communication with the quantum driven video rendering platform 103. For example, the user device 102 and/or quantum driven video rendering platform 103 may launch a chatbot that may be configured to provide support on behalf of an enterprise institution (e.g., a financial institution or the like).

At step 207, the user device 102 may receive user input via the chatbot application. For example, the user device 102 may receive a user query and/or other information providing additional context for the query. As a particular example, the user device 102 may receive a query requesting assistance with a password reset.

At step 208, the user device 102 may send chatbot interaction information (e.g., indicating the query and/or additional context received at step 207) to the quantum driven video rendering platform 103. For example, the user device 102 may send the chatbot interaction information to the quantum driven video rendering platform 103 while the first wireless data connection is established.

At step 209, the quantum driven video rendering platform 103 may receive the chatbot interaction information sent at step 208. For example, the quantum driven video rendering platform 103 may receive the chatbot interaction information via the communication interface 113 and while the first wireless data connection is established.

Figure 2C:
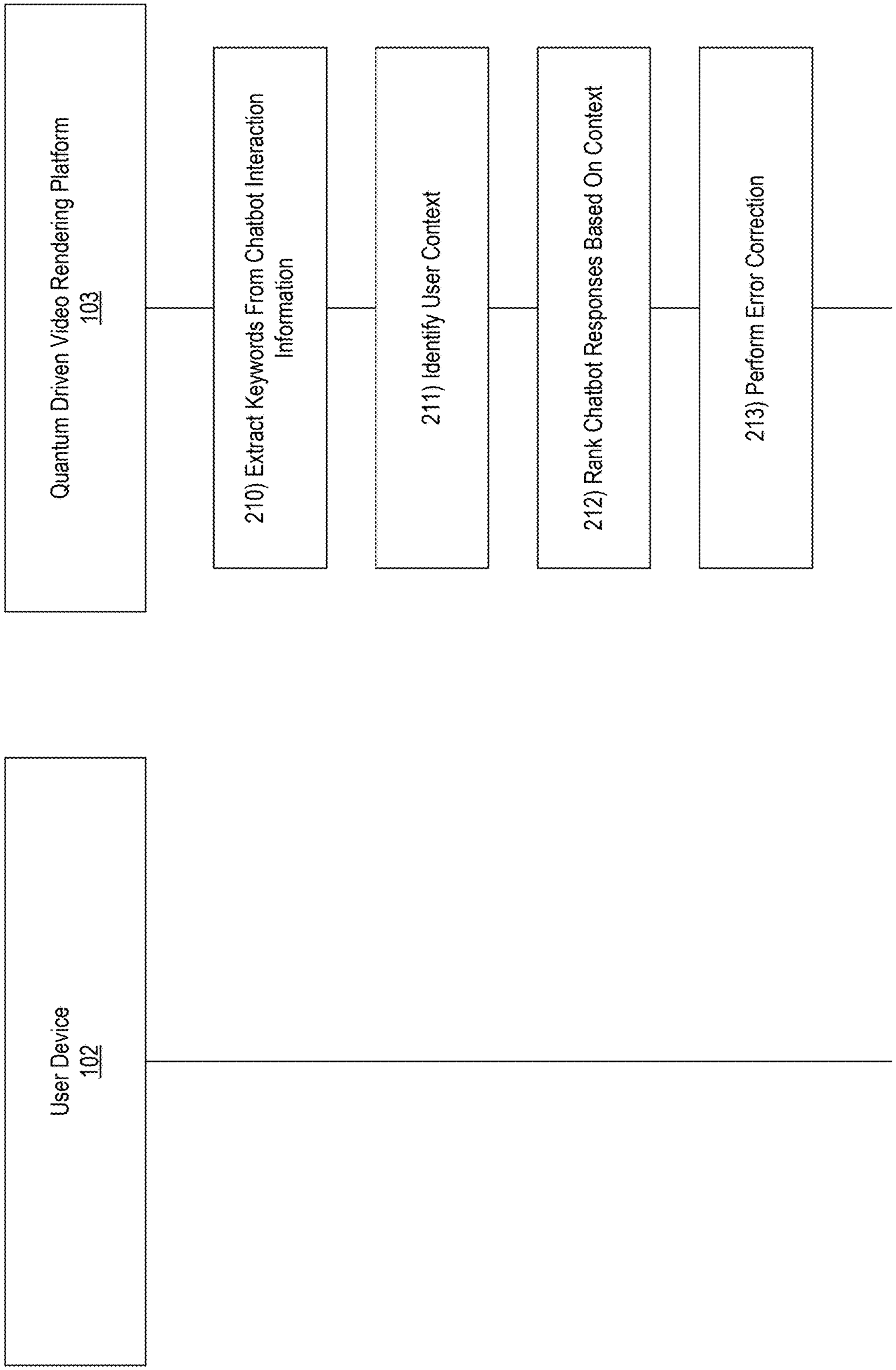

Referring to FIG. 2C, at step 210, the quantum driven video rendering platform 103 may extract keywords from the chatbot interaction information. For example, the quantum driven video rendering platform 103 may apply one or more semantic understanding techniques (such as natural language processing, natural language understanding, and/or other techniques) to extract keywords from the chatbot interaction information. In some instances, the quantum driven video rendering platform 103 may store the keywords in a qubit lattice.

At step 211, the quantum driven video rendering platform 103 may identify a user context associated with the chatbot interaction information. For example, the quantum driven video rendering platform 103 may consult the distributed ledger to identify historical context information associated with the user that submitted the query.

At step 212, the quantum driven video rendering platform 103 may input the keywords and the user context into the semantic understanding and content summarization engine in order to generate chatbot responses and a corresponding ranking of the responses. For example, the semantic understanding and content summarization engine may identify keyword matches based on the historical information, and may use these matches to identify corresponding chatbot responses. In this example, the semantic understanding and content summarization engine may also output, for each chatbot response, a relevance score based on the historical relevance scores and user context information. In some instances, the quantum driven video rendering platform 103 may store the relevance score in a qubit lattice.

Once a plurality of responses have been generated, the quantum driven video rendering platform 103 may rank the responses based on their corresponding relevance scores. For example, the quantum driven video rendering platform 103 may rank the responses with higher relevance scores above responses with lower relevance scores, which may, e.g., result in a highest ranked response. Due to the use of user context in the ranking, in some instances, a ranking of a plurality of responses for a first user may be different than a ranking of the same plurality of responses for a second user. In some instances, the quantum driven video rendering platform 103 may store the ranking in a qubit lattice.

At step 213, the quantum driven video rendering platform 103 may perform error correction of data associated with the highest ranked response. The result of this error correction may be frame information, which may, e.g., be used to generate image frames corresponding to the highest ranked response (e.g., information configured for input into a quantum image generator). For example, the quantum driven video rendering platform 103 may use a quancryption module to perform the error correction, and may store the results of the error correction in a qubit storage medium.

Figure 2D:
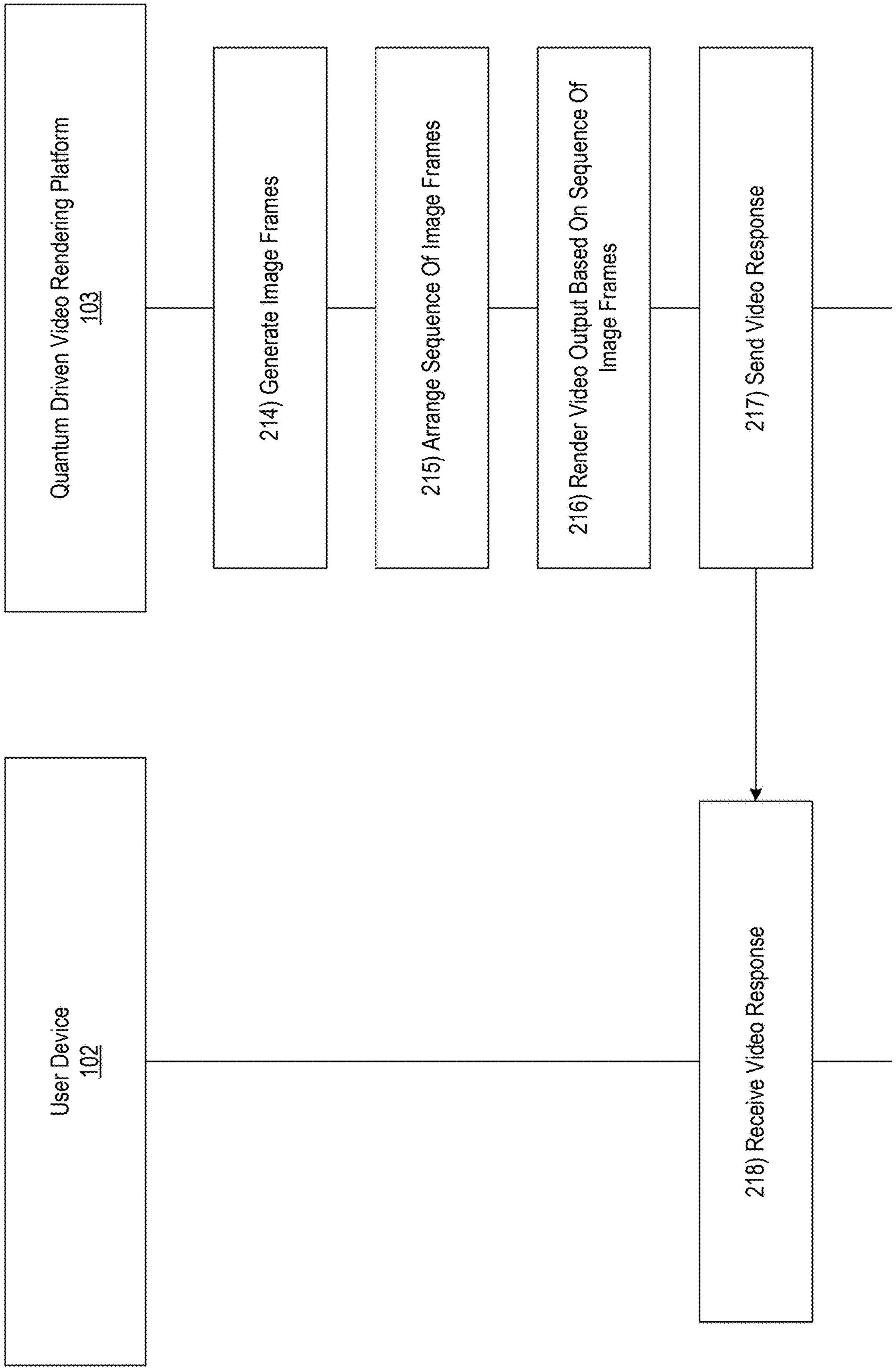

Referring to FIG. 2D, at step 214, the quantum driven video rendering platform 103 may generate image frames based on the frame information produced at step 213. For example, the quantum driven video rendering platform 103 may use a quantum image generator to apply one or more novel adaptive quantum representation (NAQR) techniques to produce image frames. For example, an encoder-decoder pair may be used to generate images from the keyword (or keywords) associated with the highest ranked response. In some instances, the quantum driven video rendering platform 103 may store the image frames in a superimposed state.

At step 215, the quantum driven video rendering platform 103 may input the image frames, the chatbot interaction information, and/or the user context information into the frame estimator engine to identify a sequence for the image frames, generated at step 214. For example, the frame estimator engine may identify a sequence in which the image frames may be arranged to produce a video output. For example, the quantum driven video rendering platform 103 may identify a stored correlation between the image frames, chatbot interaction information, and/or user context information with historical information used to train the frame estimator engine, and may identify the sequence based on this stored correlation. For example, the quantum driven video rendering platform 103 may access the frame estimator engine to identify related recent issues faced by the user, a situational study of the user over a period of time, and/or other information. Using deep reinforcement learning, the quantum driven video rendering platform 103 may identify, based on this identified information and the image frames, a sequence in which to arrange the image frames. In some instances, the quantum driven video rendering platform 103 may use a probabilistic cognitive error cancellation module to identify a sequence with a highest correlation to the ledger data, historical activities of the user, and/or other information. In some instances, this may involve running multiple trials until a probability of success of the video meets or exceeds a particular threshold. After identifying the sequence, the quantum driven video rendering platform 103 may arrange the image frames produced at step 214, according to the sequence.

At step 216, the quantum driven video rendering platform 103 may render a video output using the image frames as arranged at step 215. For example, in doing so, the quantum driven video rendering platform 103 may render a video response to the user query received as part of the user input at step 207 via the chatbot (such as a video tutorial providing step by step guidance to reset a password, or the like). Due to the use of user context in identifying the responses, image frames, and ultimately the image frame sequence, a video output produced in response to a query for a first user may be customized to that user (and thus may, in some instances, be different than a video output produced for a second user in response to the same query).

In some instances, prior to providing the video to the user, the quantum driven video rendering platform 103 may use the QIHLF to evaluate the user for a fault tolerance. For example, the quantum driven video rendering platform 103 may incorporate quantum principles to optimize consensus for improved scalability and efficiency of the system. In instances where the video output does not satisfy the fault tolerance, the video output might not be sent to the user.

At step 217, the quantum driven video rendering platform 103 may send the video response, generated at step 216, to the user device 102. For example, the quantum driven video rendering platform 103 may send the video response via the communication interface 113 and while the first wireless data connection is established. In some instances, the quantum driven video rendering platform 103 may also send one or more commands directing the user device 102 to display the video response.

Figure 4:
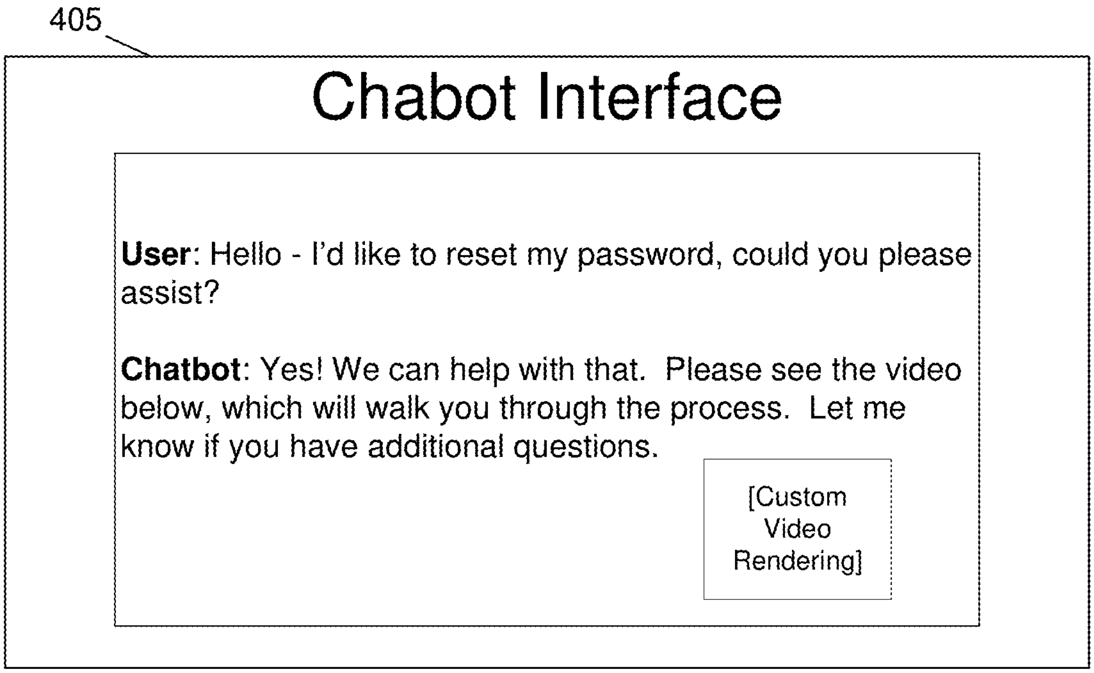
FIG. 4 depicts an illustrative user interface for performing quantum driven user specific real time dynamic video rendering in accordance with one or more example embodiments.

At step 218, the user device 102 may receive the video response sent at step 217. For example, the quantum driven video rendering platform 103 may receive the video response while the first wireless data connection is established. In some instances, the user device 102 may also receive the one or more commands directing the user device 102 to display the video response, and may display the video response in response (e.g., within the chatbot application, or the like). For example, the user device 102 may display a graphical user interface similar to graphical user interface 405, which is illustrated in FIG. 4. In doing so, the user device 102 may increase the case with which a user may submit a question via a chatbot and receive an applicable query driven demo video, which may e.g., provide a video tutorial that responds to the question (e.g., a video showing how to reset a password, or the like).

Figure 2E:
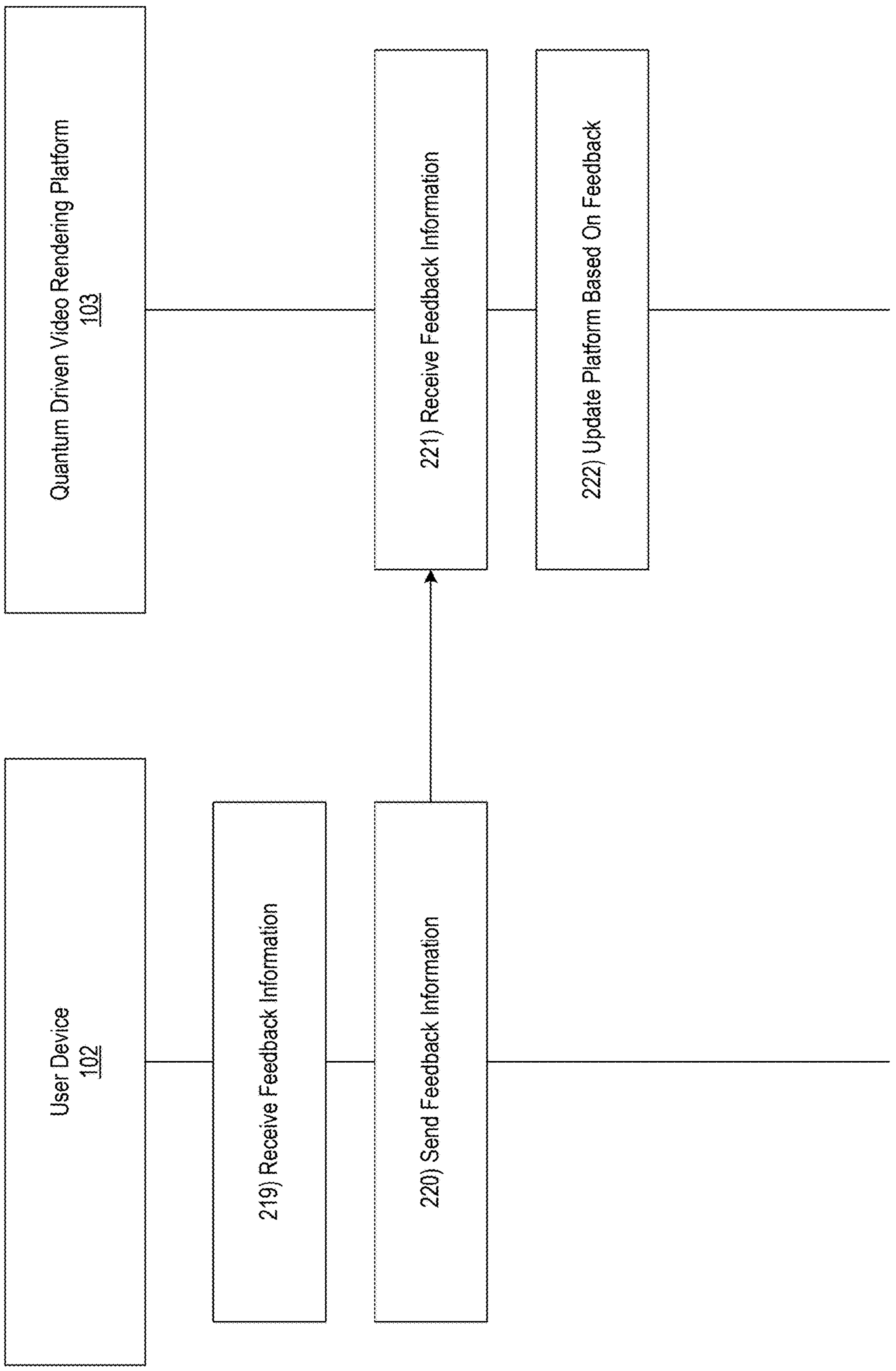

Referring to FIG. 2E, at step 219, the user device 102 may receive feedback information. For example, the user device 102 may receive feedback indicating whether or not the video response provided a satisfactory solution for the request the user submitted to the chatbot.

At step 220, the user device 102 may send the feedback information to the quantum driven video rendering platform 103. For example, the user device 102 may send the feedback information to the quantum driven video rendering platform 103 while the first wireless data connection is established.

At step 221, the quantum driven video rendering platform 103 may receive the feedback information sent at step 220. For example, the quantum driven video rendering platform 103 may receive the feedback information via the communication interface 113 and while the first wireless data connection is established.

At step 222, the quantum driven video rendering platform 103 may update the distributed ledger, semantic understanding and content summarization engine, and/or frame estimator engine based on the feedback. For example, the quantum driven video rendering platform 103 may input the feedback, keywords, query response, relevance score, image frames, sequence, and/or other information into the distributed ledger, semantic understanding and content summarization engine, and/or frame estimator engine using an iterative feedback loop to continuously and dynamically refine the ledger and these engines, which may, e.g., result in improved accuracy and effectiveness of the quantum driven video rendering platform 103 accordingly.

Figure 3:
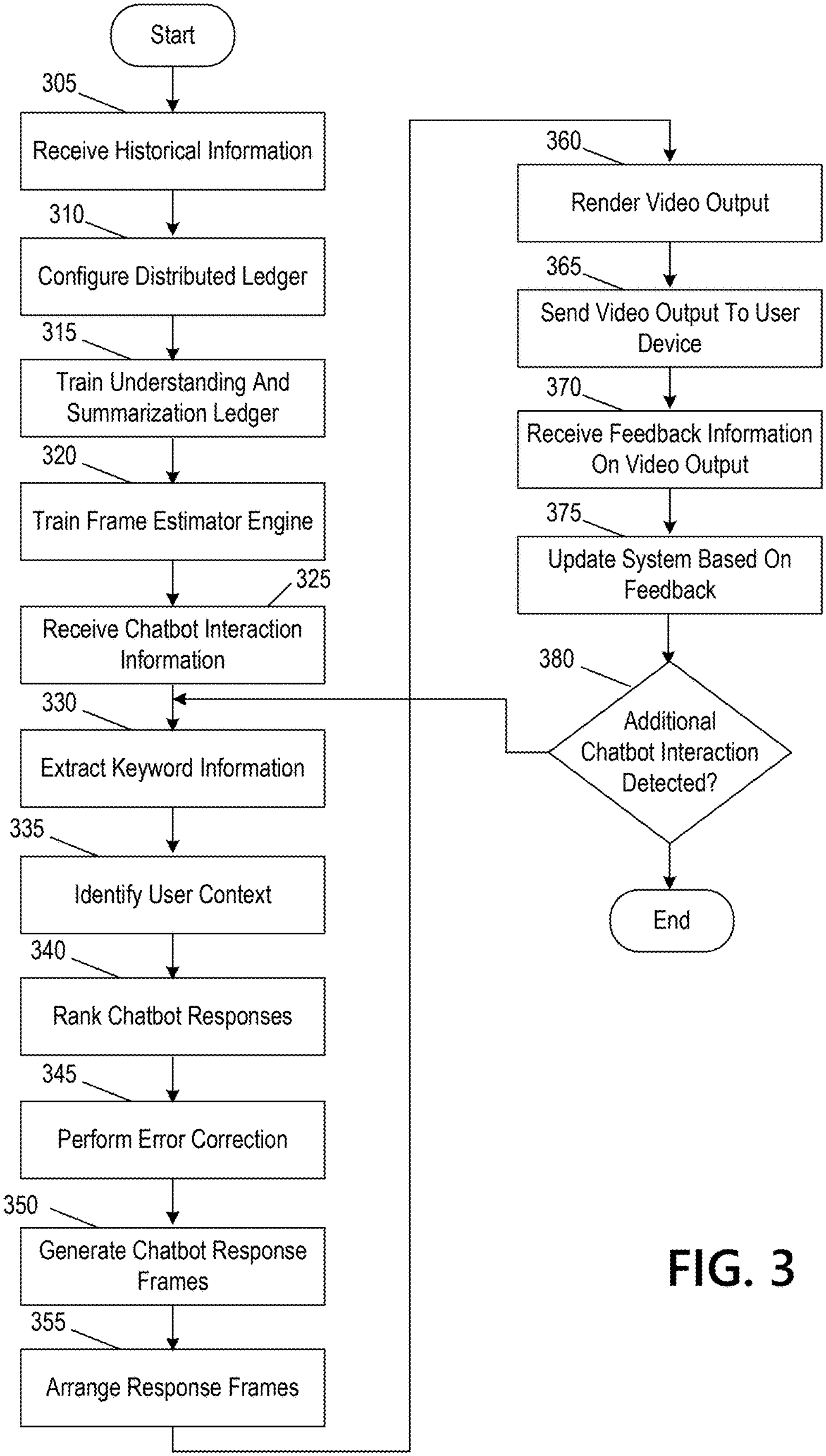
FIG. 3 depicts an illustrative method for performing quantum driven user specific real time dynamic video rendering in accordance with one or more example embodiments.

FIG. 3 depicts an illustrative method for performing quantum driven video rendering in accordance with one or more example embodiments. Referring to FIG. 3, at step 305, a computing platform having at least one processor, a communication interface, and memory may receive historical information. At step 310, the computing platform may configure a distributed ledger based on the historical information. At step 315, the computing platform may train a semantic understanding and content summarization engine. At step 320, the computing platform may train a frame estimator engine. At step 325, the computing platform may receive chatbot interaction information indicating a user query received via the chatbot. At step 330, the computing platform may extract keyword information from the chatbot interaction information. At step 335, the computing platform may identify user context for the user based on the distributed ledger. At step 340, the computing platform may generate and rank chatbot responses to the query based on the user context. At step 345, the computing platform may perform error correction on a highest ranked chatbot response. At step 350, the computing platform may generate chatbot response frames based on the highest ranked chatbot response. At step 355, the computing platform may identify a frame sequence and arrange the chatbot response frames according to the frame sequence. At step 360, the computing platform may render a video output based on the arranged chatbot response frames. At step 365, the computing platform may send the video output to a user device for display. At step 370, the computing platform may receive feedback on the video output. At step 375, the computing platform may update the distributed ledger, semantic understanding and content summarization engine, and/or frame estimator engine based on the feedback. At step 380, the computing platform may identify whether another chatbot interaction is detected. If not, the method may end. If so, the computing platform may return to step 330.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device.

The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:

at least one processor;

a communication interface communicatively coupled to the at least one processor; and memory storing computer-readable instructions that, when executed by the at least one processor, cause the computing platform to:

receive chatbot interaction information indicating interactions of a user with a chatbot;

identify context information associated with the user;

generate, by inputting the chatbot interaction information and the context information into a semantic understanding and content summarization engine, a plurality of responses to the user interactions;

select a first response of the plurality of responses to the user interactions, wherein selecting the first response comprises:

ranking, based on the context information, the plurality of responses, and selecting a highest ranked response of the plurality of responses, wherein a ranking of the plurality of responses for a first user and a ranking of the plurality of responses for a second user are the same, wherein context information associated with the second user is substantially similar to the context information associated with the first user;

generate a plurality of image frames corresponding to the first response, wherein generating the plurality of image frames corresponding to the first response comprises:

performing error correction of data associated with the first response using a quancryption module, storing results of the error correction in a qubit storage medium, generating, based on the results of the error correction, input information for a quantum image generator, and inputting the input information into the quantum image generator to produce the plurality of image frames using quantum representation techniques;

arrange, based on the context information and using an intelligent frame estimation engine, the plurality of image frames in a first sequence for the first user, wherein the plurality of image frames are arranged in a second sequence for the second user, wherein the second sequence is different than the first sequence;

render a video output using the plurality of image frames and based on the first sequence, wherein the video output comprises a response to the chatbot interaction information; and send, to a user device of the user, the video output and one or more commands directing the user device to display the video output, wherein sending the one or more commands directing the user device to display the video output causes the user device to display the video output.

2. The computing platform of claim 1, wherein:

the chatbot interaction information includes a request from the user, and wherein the video output includes a tutorial providing a response to the request, generating the plurality of image frames corresponding to the first response comprises:

generating, based on the first response, input information for a quantum image generator, formatting the input information using quantum error correction, and inputting the input information into the quantum image generator; and the context information is stored using a distributed ledger.

3. The computing platform of claim 1, wherein the context information includes historical chatbot interactions for the user.

4. The computing platform of claim 1, wherein the memory stores additional computer-readable instructions that, when executed by the at least one processor, cause the computing platform to:

train, using historical chatbot interaction information and historical context information, the semantic understanding and content summarization engine, wherein training the semantic understanding and content summarization engine configures the semantic understanding and content summarization engine to output a plurality of responses to chatbot requests.

5. The computing platform of claim 1, wherein the memory stores additional computer-readable instructions that, when executed by the at least one processor, cause the computing platform to:

extract, from the chatbot interaction information, one or more keywords, wherein generating the plurality of responses is based on the one or more keywords.

6. The computing platform of claim 1, wherein the ranking of the plurality of responses for the first user is different than a ranking of the plurality of responses for a third user.

7. The computing platform of claim 6, wherein:

a first portion of the plurality of responses is generated for the first user and a second portion of the plurality of responses is generated for the third user, the first portion of the plurality of responses is generated using a naïve Bayesian model, and the second portion of the plurality of responses is generated using hierarchical clustering.

8. The computing platform of claim 6, wherein:

a first portion of the plurality of responses is generated for the first user and a second portion of the plurality of responses is generated for the third user, the first portion of the plurality of responses is generated using a principal component analysis model, and the second portion of the plurality of responses is generated using k-means clustering.

9. The computing platform of claim 1, wherein the memory stores additional computer-readable instructions that, when executed by the at least one processor, cause the computing platform to:

train, using historical chatbot interaction information and historical context information, the intelligent frame estimation engine, wherein training the intelligent frame estimation engine configures the intelligent frame estimation engine to output frame sequences.

10. The computing platform of claim 1, wherein the memory stores additional computer-readable instructions that, when executed by the at least one processor, cause the computing platform to:

receive feedback information on the video output; and update, based on the feedback information, the semantic understanding and content summarization engine and the intelligent frame estimation engine.

11. A method comprising:

at a computing platform comprising at least one processor, a communication interface, and memory:

receiving chatbot interaction information indicating interactions of a user with a chatbot;

identifying context information associated with the user;

generating, by inputting the chatbot interaction information and the context information into a semantic understanding and content summarization engine, a plurality of responses to the user interactions;

selecting a first response of the plurality of responses to the user interactions, wherein selecting the first response comprises:

ranking, based on the context information, the plurality of responses, and selecting a highest ranked response of the plurality of responses, wherein a ranking of the plurality of responses for a first user and a ranking of the plurality of responses for a second user are the same, wherein context information associated with the second user is substantially similar to the context information associated with the first user;

generating a plurality of image frames corresponding to the first response, wherein generating the plurality of image frames corresponding to the first response comprises:

performing error correction of data associated with the first response using a quancryption module, storing results of the error correction in a qubit storage medium, generating, based on the results of the error correction, input information for a quantum image generator, and inputting the input information into the quantum image generator to produce the plurality of image frames using quantum representation techniques;

arranging, based on the context information and using an intelligent frame estimation engine, the plurality of image frames in a first sequence for the first user, wherein the plurality of image frames are arranged in a second sequence for the second user, wherein the second sequence is different than the first sequence;

rendering a video output using the plurality of image frames and based on the first sequence, wherein the video output comprises a response to the chatbot interaction information; and sending, to a user device of the user, the video output and one or more commands directing the user device to display the video output, wherein sending the one or more commands directing the user device to display the video output causes the user device to display the video output.

12. The method of claim 11, wherein:

the chatbot interaction information includes a request from the user, and wherein the video output includes a tutorial providing a response to the request, generating the plurality of image frames corresponding to the first response comprises:

generating, based on the first response, input information for a quantum image generator, formatting the input information using quantum error correction, and inputting the input information into the quantum image generator; and the context information is stored using a distributed ledger.

13. The method of claim 11, wherein the context information includes historical chatbot interactions for the user.

14. The method of claim 11, further comprising:

training, using historical chatbot interaction information and historical context information, the semantic understanding and content summarization engine, wherein training the semantic understanding and content summarization engine configures the semantic understanding and content summarization engine to output a plurality of responses to chatbot requests.

15. The method of claim 11, further comprising:

extracting, from the chatbot interaction information, one or more keywords, wherein generating the plurality of responses is based on the one or more keywords.

16. The method of claim 11, wherein the ranking of the plurality of responses for the first user is different than a ranking of the plurality of responses for a third user.

17. The method of claim 11, further comprising:

training, using historical chatbot interaction information and historical context information, the intelligent frame estimation engine, wherein training the intelligent frame estimation engine configures the intelligent frame estimation engine to output frame sequences.

18. The method of claim 11, further comprising:

receiving feedback information on the video output; and updating, based on the feedback information, the semantic understanding and content summarization engine and the intelligent frame estimation engine.

19. One or more non-transitory computer-readable media storing instructions that, when executed by a computing platform comprising at least one processor, a communication interface, and memory, cause the computing platform to:

receive chatbot interaction information indicating interactions of a user with a chatbot;

identify context information associated with the user;

generate, by inputting the chatbot interaction information and the context information into a semantic understanding and content summarization engine, a plurality of responses to the user interactions;

select a first response of the plurality of responses to the user interactions, wherein selecting the first response comprises:

ranking, based on the context information, the plurality of responses, and selecting a highest ranked response of the plurality of responses, wherein a ranking of the plurality of responses for a first user and a ranking of the plurality of responses for a second user are the same, wherein context information associated with the second user is substantially similar to the context information associated with the first user;

generate a plurality of image frames corresponding to the first response, wherein generating the plurality of image frames corresponding to the first response comprises:

performing error correction of data associated with the first response using a quancryption module, storing results of the error correction in a qubit storage medium, generating, based on the results of the error correction, input information for a quantum image generator, and inputting the input information into the quantum image generator to produce the plurality of image frames using quantum representation techniques;

arrange, based on the context information and using an intelligent frame estimation engine, the plurality of image frames in a first sequence for the first user, wherein the plurality of image frames are arranged in a second sequence for the second user, wherein the second sequence is different than the first sequence;

render a video output using the plurality of image frames and based on the first sequence, wherein the video output comprises a response to the chatbot interaction information; and send, to a user device of the user, the video output and one or more commands directing the user device to display the video output, wherein sending the one or more commands directing the user device to display the video output causes the user device to display the video output.

20. The one or more non-transitory computer-readable media of claim 19, wherein:

the chatbot interaction information includes a request from the user, and wherein the video output includes a tutorial providing a response to the request, generating the plurality of image frames corresponding to the first response comprises:

generating, based on the first response, input information for a quantum image generator, formatting the input information using quantum error correction, and inputting the input information into the quantum image generator; and the context information is stored using a distributed ledger.

* * * * *